US008022955B2

(12) United States Patent
Demizu et al.

(10) Patent No.: US 8,022,955 B2
(45) Date of Patent: Sep. 20, 2011

(54) OPERABILITY VERIFICATION APPARATUS, OPERABILITY VERIFICATION METHOD, AND COMPUTER-READABLE STORAGE MEDIUM STORING OPERABILITY VERIFICATION PROGRAM

(75) Inventors: Koji Demizu, Kawasaki (JP); Hidekatsu Sasaki, Kawasaki (JP); Masayuki Kidera, Kawasaki (JP); Wataru Nishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 12/320,358

(22) Filed: Jan. 23, 2009

(65) Prior Publication Data
US 2009/0135185 A1 May 28, 2009

Related U.S. Application Data

(63) Continuation of application No. PCT/JP2006/314624, filed on Jul. 25, 2006.

(51) Int. Cl.
G06T 13/00 (2011.01)
G06T 15/00 (2011.01)
(52) U.S. Cl. ........................................ 345/474; 345/419
(58) Field of Classification Search .................. None
See application file for complete search history.

(56) References Cited

U.S. PATENT DOCUMENTS

| 5,418,712 | A | | 5/1995 | Miwa et al. |
| 5,590,268 | A | * | 12/1996 | Doi et al. ............... 715/848 |
| 5,768,565 | A | | 6/1998 | Matsuda et al. |
| 5,995,729 | A | * | 11/1999 | Hirosawa et al. ............ 703/1 |
| 6,205,367 | B1 | * | 3/2001 | Arita et al. ............... 700/98 |
| 6,252,579 | B1 | * | 6/2001 | Rosenberg et al. ........ 715/856 |
| 7,472,047 | B2 | * | 12/2008 | Kramer et al. .............. 703/6 |
| 2004/0021660 | A1 | * | 2/2004 | Ng-Thow-Hing et al. ... 345/419 |
| 2004/0227750 | A1 | * | 11/2004 | Su et al. .................. 345/419 |
| 2006/0106757 | A1 | * | 5/2006 | Sakai et al. ................ 707/2 |

FOREIGN PATENT DOCUMENTS

| JP | 6-348791 | 12/1994 |
| JP | 7-110804 | 4/1995 |
| JP | 8-147265 | 6/1996 |
| JP | 2004-178222 | 6/2004 |

OTHER PUBLICATIONS

X.F. Zha, Soft computing framework for intelligent human—machine system design, simulation and optimization, Soft Computing (7) (2003) 184-198.* International Search Report issued on Feb. 13, 2009 in corresponding International Patent Application PCT/JP2006/314624.
*International Search Report* International Application No. PCT/JP2006/314624; International Search Report Mailing Date: Oct. 24, 2006.

* cited by examiner

*Primary Examiner* — Daniel Hajnik
(74) *Attorney, Agent, or Firm* — Fujitsu Patent Center

(57) ABSTRACT

An operability verification apparatus includes a work plane generation section that generates a work plane on a virtual space where a three-dimensional model of an equipment to be verified is disposed; a plane display section where a two-dimensional image on a work plane generated in the work plane generation section of the three-dimensional model is displayed on the display screen; and a mark display update section in which a mark representative of the pointing device is displayed on the display screen, and upon receipt of the notification of direction of movement and migration length of the pointing device, the mark on the display screen is moved in the direction of the movement corresponding to the direction of the movement of the pointing device by only a migration length in which a ratio of a real size of the equipment to a display size of the two-dimensional image on the display screen is considered.

17 Claims, 25 Drawing Sheets

FIG. 30

PSEUDO USER TABLE

| ID | PSEUDO USER NAME | HEIGHT | UPPER ARM | UPPER ARM ANGLE | FOREARM | FOREARM ANGLE | HORIZONTAL LENGTH(X) FROM SHOULDER | HORIZONTAL LENGTH(Y) FROM SHOULDER |
|---|---|---|---|---|---|---|---|---|
| USER | OPERATOR | height | 0.1676 × height | 0 | 0.1490 × height | 90 | 0.1490 × height | 0 |
| MAN 50% | MAN 50% TILE VALUE | 1714 | 287.2 | 0 | 259.4 | 90 | 259.4 | 0 |
| FEMALE 50% | WOMAN 50% TILE VALUE | 1591.3 | 269.7 | 0 | 230.7 | 90 | 230.7 | 0 |

FIG. 31

ITEM TABLE

| ID | ITEM NAME | POINTER COORDINATES(X) | POINTER COORDINATES(Y) | POTATION ANGLE | IMAGE FILE NAME | WIDTH OF IMAGE | LENGTH OF IMAGE |
|---|---|---|---|---|---|---|---|
| ITEM001 | STANDARD | 0 | 0 | 0 | hyojun.jpg | 80 | 80 |
| ITEM002 | HAND | 5 | 20 | 45 | hand.jpg | 90 | 230 |
| ITEM003 | DRIVER | 5 | 40 | 90 | screwdriver.jpg | 15 | 300 |
| ITEM004 | BANKBOOK | 10 | 10 | 0 | bankbook.jpg | 60 | 300 |

FIG. 32

WARNING MESSAGE TABLE

| ID | WARNING MESSAGE | DETAILED EXPLANATION |
|---|---|---|
| ALARM001 | MOVEMENT LIMIT | Specified part cannot be moved any further. |
| ALARM002 | ROTATION LIMIT | Specified part cannot be rotated any further. |
| ALARM003 | INTERFERENCE GENERATION | Interference is generated in specified part and device. |

FIG. 33

WORK PLANE TABLE

| ID | ABSOLUTE COORDINATES(X) | ABSOLUTE COORDINATES(Y) | ABSOLUTE COORDINATES(Z) | ROTATION ANGLE | DISPLAY SCALE | PROJECTIVE METHOD | VERIFICATION MODEL |
|---|---|---|---|---|---|---|---|
| ITEM001 | 100 | | | 0 | 1 | PROJECTION DRAWING | ATM |
| ITEM002 | | | 40 | 45 | 0.1 | CROSS SECTION | ATM |
| ITEM003 | | 500 | | 0 | 0.05 | CROSS SECTION & PROJECTION DRAWING | ATM |

FIG. 34

INITIAL OPERATION POSITION TABLE

| ID | WORK PLANE | PLANE COORDINATES(X) | PLANE COORDINATES(Y) |
|---|---|---|---|
| STRAT001 | ITEM001 | 40 | 50 |
| STRAT002 | ITEM001 | 300 | 40 |
| STRAT003 | ITEM003 | 500 | 200 |

FIG. 35

PART INSTRUCTION CONTROL TABLE

| ID | PARTS NAME | PARTS TYPE | Shape-ID | STARTING POINT | | | MOVEMENT LIMITATION | | | | | |
|---|---|---|---|---|---|---|---|---|---|---|---|---|
| | | | | X | Y | Z | X | Y | Z | RX | RY | RZ |
| PART001 | ATM | ASSY | | 0 | 0 | 0 | 0 | 0 | 0 | 0 | 0 | 0 |
| PART002 | Cover | ASSY | | 0 | 0 | 0 | 0 | 0 | 0 | 0 | 110 | 0 |
| PART003 | Lower | PARTS | SHAPE001 | −0.02 | 3.9 | 183.1 | 5.7 | 15.5 | 57 | 0 | 0 | 0 |
| PART004 | Screw−25×5s | PARTS | SHAPE002 | −125 | 25.5 | 174.1 | −125 | 26.6 | 174.1 | 0 | 0 | 0 |
| PART005 | Upper | ASSY | | 0 | 0 | 0 | 136.9 | 0 | 0 | 0 | 0 | 40 |
| PART006 | Screw−25×5s | PARTS | SHAPE002 | 136.9 | 26.4 | 95.1 | 136.9 | 26.3 | 95.1 | 0 | 0 | 0 |

FIG. 36

MIGRATION LENGTH TABLE

| ID | PLANE COORDINATES(X) | PLANE COORDINATES(Y) |
|---|---|---|
| INPUT | 40 | 50 |

FIG. 37

OPERATION POSITION UPDATE TABLE

| ID | INITIAL POSITION | PSEUDO USER | UPDATE POSITION COORDINATES(X) | UPDATE POSITION COORDINATES(Y) | ITEM | PARTS | WARNING | ACTIVE |
|---|---|---|---|---|---|---|---|---|
| MOVE001 | STRAT001 | USER | 50 | 200 | ITEM001 | | | ☆ |
| MOVE002 | STRAT002 | MAN50% | 0 | 0 | ITEM003 | | | |
| MOVE003 | STRAT003 | MAN50% | 0 | 0 | ITEM002 | PART001 | ALARM001 | |

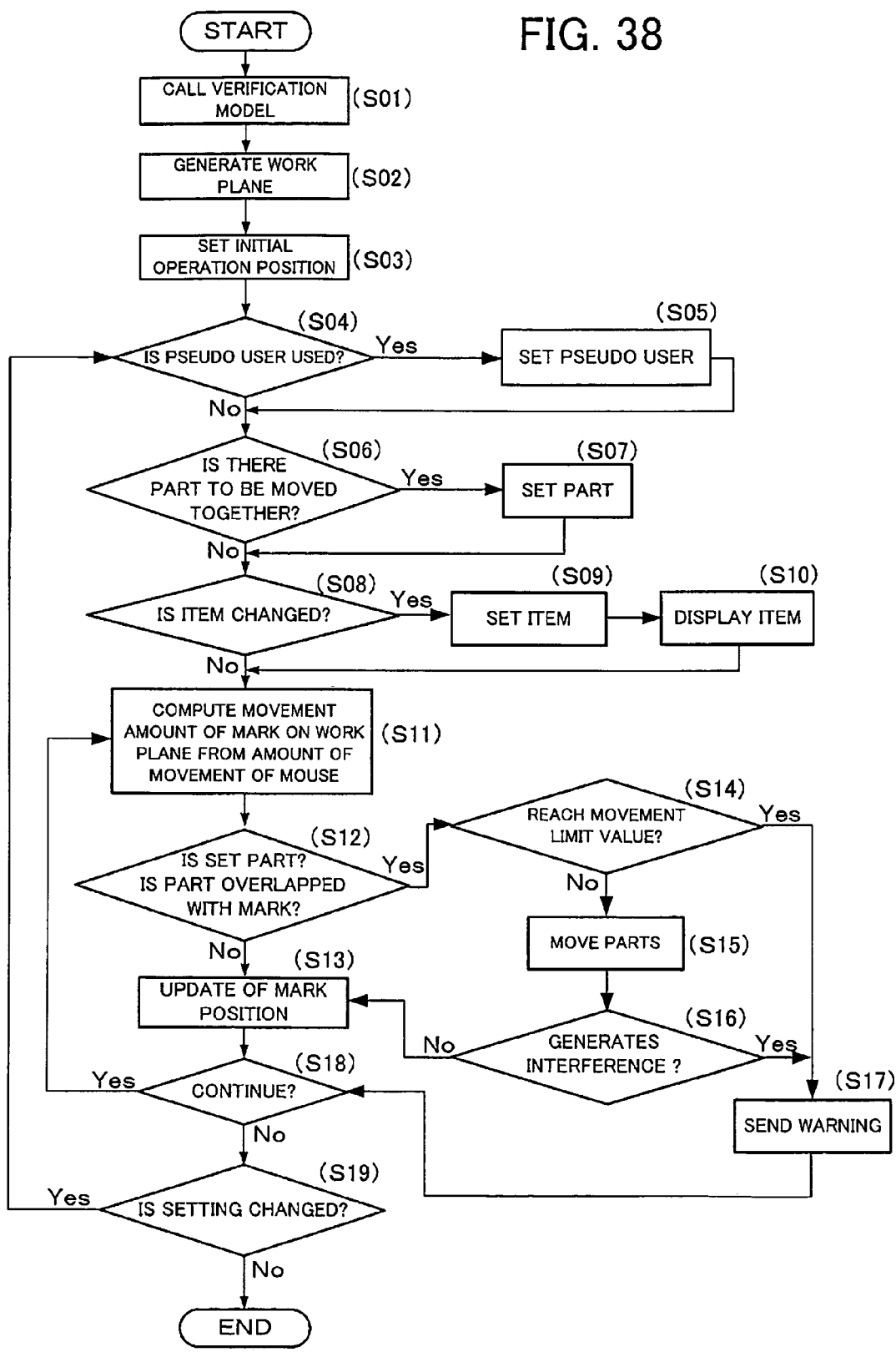

OPERABILITY VERIFICATION APPARATUS, OPERABILITY VERIFICATION METHOD, AND COMPUTER-READABLE STORAGE MEDIUM STORING OPERABILITY VERIFICATION PROGRAM

CROSS REFERENCE TO RELATED APPLICATIONS

This application is a continuing application, filed under 35 U.S.C. §111(a), of International Application PCT/JP2006/314624, filed Jul. 25, 2006, the disclosure of which is incorporated herein by reference.

TECHNICAL FIELD

The present invention relates to an operability verification apparatus in which a three-dimensional model of image on data that represents equipment to be verified is displayed on a display screen, and the operability of the equipment is verified by the simulation, an operability verification method in which a three-dimensional model of image on data that represents equipment to be verified is displayed on a display screen, and the operability of the equipment is verified by the simulation, using the operability verification apparatus as mentioned above, and a computer-readable storage medium storing an operability verification program to be executed in an information processing apparatus, which causes the information processing apparatus to operate as an operability verification apparatus.

BACKGROUND ART

In recent years, three-dimensional data making of the device design is advanced, and when an operability such as convenience and the usability of the device wherein it is designing or design ends is verified, the verification on a virtual space is done. That is, the operability of the device is verified by displaying the image of three dimension model of the device on a display screen of computers and the like. Because the size of the device on the virtual space (size of the image of three dimension model on the display screen) is different from an actual size of the device, it tries to make the operator recognize the feeling of the device by displaying the size on the numerical value and the scale in the image of the device on the display screen generally so far.

FIG. 1 is a view showing a state where an operator is verifying the operability of the equipment on a virtual space. FIG. 2 is a view showing a display image in a monitor.

Here, a monitor 12 for the image display is put on a desk 11 as shown in FIG. 1, and the operability of the equipment displayed in the monitor is being verified by an operator 1.

FIG. 2 shows an example of the display image on the monitor 12 at that. Here, an ATM is assumed as an equipment to be verified. Size d of an actual ATM is written in the display image shown in FIG. 2, so that those who operate it see size d written in the display image, ideally imagine the size of the ATM, and imagine the operability where the arm is extended, for instance.

However, according to such a verification method, there is a need for an operator to grasp the distance feeling and the scale feeling depending on only ideal information like the numerical value and the scale, and thus such a verification method is an insufficient verification method in the point that the operator experiences the operability of the equipment.

As a verification method by which the operability of the equipment can be experienced, there is known a method of using a so-called virtual reality that the technique of the motion capture that detects the operator's operation is adopted, to make a model to imitate the human body on a virtual space (on the display screen) appear, and to make the model imitate the movement of the operator detected by the motion capture, thereby performing verification while seeing a positional relation between the image of the device on the display screen and the image of the human body model image. According to this verification method, an operator's model appears in a virtual space, and the same movement as operator's movement is made, so that the operator can experience the operability of the equipment. This verification method is often adopted for the operability verification of the product.

However, to adopt such a verification method, there is a need to use special equipment as the motion capture that detects the operator's operation. Such special equipment is very expensive, and it needs a large occupation space when using it. Thus, this involves a problem that the operability verification is not easily performed.

Japanese Patent Document 1: TokuKaiHei.6-348791 proposes a method in which a model on a real space to imitate an operation section of equipment is prepared, and the movement of an operator's finger when the operator operates the model is detected, and informs an operability evaluation device of the detected movement, so that the operability of the model of the equipment in the virtual space constructed in the operability evaluation device is evaluated.

However, according to the method of Japanese Patent Document 1, there is a need to install in an operator's finger a sensor for detecting the movement of the finger, and it belongs to the above-mentioned motion capture, and it is the motion capture of a simple version. Therefore, the equipment to be evaluated in operability will be limited.

Japanese Patent Document 2: TokuKaiHei.7-110804 proposes a technique of evaluating operability for various types of users in such a manner that an operation section of the equipment is displayed on a display screen, and it is displayed with changing a red lamp to a green lamp assuming that it is operated by the user of color blindness, or it is displayed with making the position of the operation button right and left opposite, assuming that it is operated by a left-handedness user.

The evaluating method of Japanese Patent Document 2 has an effective point in the evaluation when only the operation section is taken out. However, according to the evaluating method of Japanese Patent Document 2, the operation section is simply displayed by various variations, and it is difficult to experience operability, and the operability is greatly different depending on an arrangement position of the operation section in the entire equipment. Thus, the evaluating method of Japanese Patent Document 2 is not suitable for the evaluation in this respect.

In view of the foregoing, it is an object of the present invention to provide an operability verification method and an operability verification apparatus that need not adopt special input device, and can experience operability of equipment easily and at a low price.

DISCLOSURE OF THE INVENTION

To achieve the above-mentioned object, the present invention provides an operability verification apparatus having a main frame body section that performs operation, a display screen that displays an image, and a pointing device that is moved by user's hand and notifies the main frame body section of direction of movement and migration length, wherein the image of a three-dimensional model on data that represents an equipment as an object to be verified is displayed on the display screen, and an operability of the equipment is verified by a simulation, the operability verification apparatus including:

a work plane generation section that generates a work plane on a virtual space where the three-dimensional model is disposed;

a plane display section where a two-dimensional image on a work plane generated in the work plane generation section of the three-dimensional model is displayed on the display screen; and a mark display update section in which a mark representative of the pointing device is displayed on the display screen, and upon receipt of the notification of direction of movement and migration length of the pointing device, the mark on the display screen is moved in the direction of the movement corresponding to the direction of the movement of the pointing device by only a migration length in which a ratio of a real size of the equipment to a display size of the two-dimensional image on the display screen is considered.

According to the operability verification apparatus of the present invention, the work plane is set in a virtual space, and the operation of mice that are general-purpose pointing devices is associated with the amount of the movement on the work plane in a virtual space for instance. Thus, the operator can experience by his arm such a matter that it collides with the equipment when how the arm is moved in a real space, or the equipment can be operated when how the arm is bent and extended. Thus, according to the operability verification apparatus of the present invention, it is possible to effectively verify operability.

In the operability verification apparatus according to the present invention as mentioned above, it is preferable that the apparatus further includes an initial position setting section wherein an initial operating position of the pointing device is associated with an initial display position of the mark on the display screen.

Having the initial position setting section becomes easy to associate an operator's posture with the position of the mark on a virtual space, and thus it becomes easy to verify operability further.

In the operability verification apparatus according to the present invention as mentioned above, it is preferable that the apparatus has a pseudo user table that describes body sizes of an operator who operates the pointing device and body sizes of a pseudo user assuming a user who uses the equipment, and wherein the mark display update section moves the mark on the display screen by only a migration length in consideration of a difference in body size between the operator and the pseudo user as well as a ratio of a real size of the equipment to a display sizes of the two-dimensional image on the display screen.

This feature makes it possible for an operate to experience by replacing it with the operator's physique a case where it is operated by the man of a standard physique for instance, a case where it is operated by the woman of a standard physique, or a case where it is operated by the child, regardless of the operator's physique.

In the operability verification apparatus according to the present invention as mentioned above, it is preferable that the apparatus has an item table that describes two or more kinds of marks on the display screen, the marks each being representative of the pointing device, and wherein the mark display update section receives a specification of the kind of the mark by the operator, and displays a specified kind of mark on the display screen.

The operation of the equipment to be verified is not necessarily limited to be done by bare-handed, and operated with something in the hand such as the operation by the driver with the driver in the hand for instance, or insertion with the bankbook in the hand in ATM (Automatic Teller Machine) according to the kind of the equipment, or according to the position where the equipment is operated. Then, two or more kinds of marks are prepared, and the kind of mark specified according to the device and the operation position is displayed, as stated above. This feature makes it possible to perform the verification with greater accuracy.

Moreover, in the operability verification apparatus according to the present invention as mentioned above, it is preferable that the mark display update section displays on the display screen movement tracks of the mark or a line where a prescribed initial position and a present location of the mark are connected with one another.

Displaying the movement tracks of the mark makes it possible to verify a series of movement of the arm. Moreover, displaying the line where the arm is imitated in the connection of an initial position and present location makes it possible to verify the presence of the interference of the device and the arm.

In the operability verification apparatus according to the present invention as mentioned above, it is preferable that the apparatus further includes:

a part specification section that specifies parts that compose the three-dimensional model; and a part control section that moves parts specified by the part specification section in synchronism with the movement of the mark.

This feature makes it possible to verify with greater accuracy the operability of movable parts such as drawers and doors for instance. Moreover, as to operability in the assembly and resolving of the device, it is possible to verify it with greater accuracy.

In the operability verification apparatus according to the present invention as mentioned above, it is preferable that the apparatus further includes a warning sending section that receives generation of a state where movement of the parts is disturbed and generates a warning.

Sending the warning makes it possible for the operator to clearly know that the part cannot be moved any more, and it is useful for an accurate verification.

The present invention relates to an operability verification method in which there is used an operability verification apparatus having a main frame body section that performs operation, a display screen that displays an image, and a pointing device that is moved by user's hand and notifies the main frame body section of direction of movement and migration length, wherein the image of a three-dimensional model on data that represents an equipment as an object to be verified is displayed on the display screen, and an operability of the equipment is verified by a simulation, the operability verification method including:

a work plane generation step that generates a work plane on a virtual space where the three-dimensional model is disposed;

a plane display step where a two-dimensional image on a work plane generated in the work plane generation step of the three-dimensional model is displayed on the display screen; and a mark display update step in which a mark representative of the pointing device is displayed on the display screen, and through the pointing device being moved, a direction of movement and a migration length of the pointing device are notified to the main frame body section by the pointing device, so that the mark on the display screen is moved in the direction of the movement corresponding to the direction of the movement of the pointing device by only a migration length in which a ratio of a real size of the equipment to a display size of the two-dimensional image on the display screen is considered.

In the operability verification method according to the present invention as mentioned above, it is preferable that the method further includes an initial position setting step wherein an initial operating position of the pointing device is associated with an initial display position of the mark on the display screen.

In the operability verification method according to the present invention as mentioned above, it is preferable that the operability verification apparatus stores a pseudo user table that describes body sizes of an operator who operates the pointing device and body sizes of a pseudo user assuming a user who uses the equipment, and wherein the mark display update step moves the mark on the display screen by only a migration length in consideration of a difference in body size between the operator and the pseudo user as well as a ratio of a real size of the equipment to a display size of the two-dimensional image on the display screen.

In the operability verification method according to the present invention as mentioned above, it is preferable that the operability verification apparatus stores an item table that describes two or more kinds of marks on the display screen, the marks each being representative of the pointing device, and wherein the mark display update step specifies the kind of the mark, and displays a specified kind of mark on the display screen.

In the operability verification method according to the present invention as mentioned above, it is preferable that the mark display update step displays on the display screen movement tracks of the mark.

In the operability verification method according to the present invention as mentioned above, it is preferable that the method further includes:

a part specification step that specifies parts that compose the three-dimensional model; and a part control step that moves parts specified by the part specification step in synchronism with the movement of the mark.

The present invention relates a computer-readable storage medium storing an operability verification program which is executed in an information processing apparatus having a main frame body section that performs a program, a display screen that displays an image, and a pointing device that is moved by user's hand and notifies the main frame body section of direction of movement and migration length, so that the operability verification program causes the information processing apparatus to operate as an operability verification apparatus wherein the image of a three-dimensional model on data that represents an equipment as an object to be verified is displayed on the display screen, and an operability of the equipment is verified by a simulation, the operability verification program causing the information processing apparatus as the operability verification apparatus comprising:

a work plane generation section that generates a work plane on a virtual space where the three-dimensional model is disposed;

a plane display section where a two-dimensional image on a work plane generated in the work plane generation section of the three-dimensional model is displayed on the display screen; and a mark display update section in which a mark representative of the pointing device is displayed on the display screen, and upon receipt of the notification of direction of movement and migration length of the pointing device, the mark on the display screen is moved in the direction of the movement corresponding to the direction of the movement of the pointing device by only a migration length in which a ratio of a real size of the equipment to a display size of the two-dimensional image on the display screen is considered.

In the computer-readable storage medium storing the operability verification program according to the present invention as mentioned above, it is preferable that the program causes the information processing apparatus to operate as the operability verification apparatus further including an initial position setting section wherein an initial operating position of the pointing device is associated with an initial display position of the mark on the display screen.

In the computer-readable storage medium storing the operability verification program according to the present invention as mentioned above, it is preferable that the program causes the information processing apparatus to operate as the operability verification apparatus wherein the apparatus has a pseudo user table that describes body sizes of an operator who operates the pointing device and body sizes of a pseudo user assuming a user who uses the equipment, and wherein the mark display update section moves the mark on the display screen by only a migration length considering a difference in body size between the operator and the pseudo user as well as a ratio of a real size of the equipment to a display size of the two-dimensional image on the display screen.

In the computer-readable storage medium storing the operability verification program according to the present invention as mentioned above, it is preferable that the program causes the information processing apparatus to operate as the operability verification apparatus wherein the apparatus has an item table that describes two or more kinds of marks on the display screen, the marks each being representative of the pointing device, and wherein the mark display update section receives a specification of the kind of the mark by the operator, and displays a specified kind of mark on the display screen.

In the computer-readable storage medium storing the operability verification program according to the present invention as mentioned above, it is preferable that the program causes the information processing apparatus to operate as the operability verification apparatus wherein the mark display update section displays on the display screen movement tracks of the mark.

In the computer-readable storage medium storing the operability verification program according to the present invention as mentioned above, it is preferable that the program causes the information processing apparatus to operate as the operability verification apparatus wherein the apparatus further includes:

a part specification section that specifies parts that compose the three-dimensional model; and a part control section that moves parts specified by the part specification section in synchronism with the movement of the mark.

In the computer-readable storage medium storing the operability verification program according to the present invention as mentioned above, it is preferable that the program causes the information processing apparatus to operate as the operability verification apparatus wherein the apparatus further includes a warning sending section that receives generation of a state where movement of the parts is disturbed and generates a warning.

As mentioned above, according to the present invention, it is possible to experience easily and at a low price the operability of the equipment.

BRIEF DESCRIPTION OF THE DRAWINGS

FIG. 30 is a view showing a pseudo user table.

FIG. 31 is a view showing an item table.

FIG. 32 is a view showing a warning message table.

FIG. 33 is a view showing a work plane table.

FIG. 34 is a view showing an initial operation position table.

FIG. 35 is a view showing a part instruction control table.

FIG. 36 is a view showing a migration length table.

FIG. 37 is a view showing an operation position update table.

FIG. 38 is a flowchart useful for understanding a program to be executed in the operability verification apparatus shown in FIG. 27 and FIG. 28.

BEST MODE FOR CARRYING OUT THE INVENTION

Hereinafter there will be explained embodiments of the present invention in conjunction with the drawings. First of all, there will be explained contents of an operability verification by an operability verification apparatus as one embodiment of the present invention.

Figure 1:
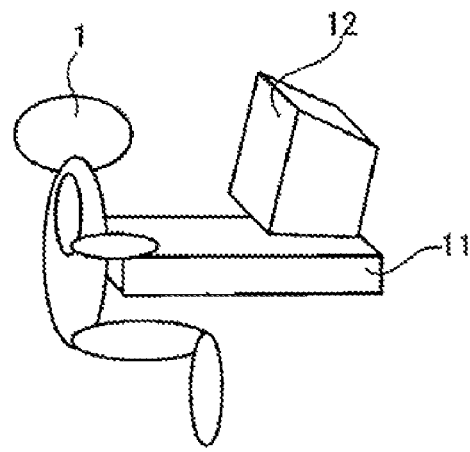
FIG. 1 is a view showing a state where an operator is verifying the operability of the equipment on a virtual space.
Figure 2:
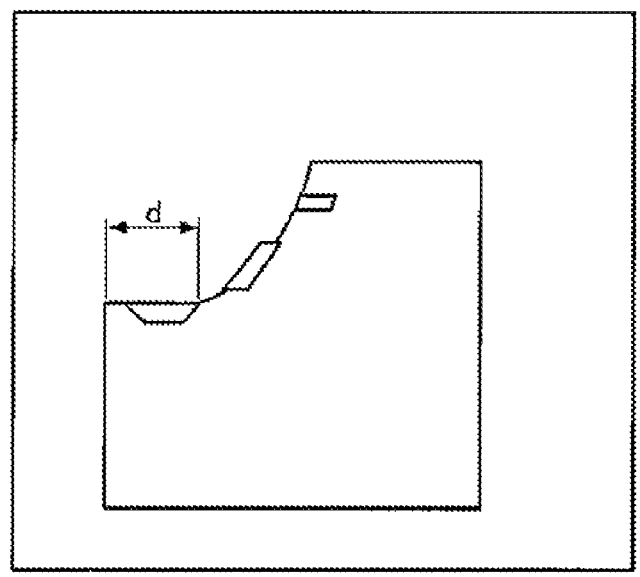
FIG. 2 is a view showing a display image in a monitor.
Figure 3:
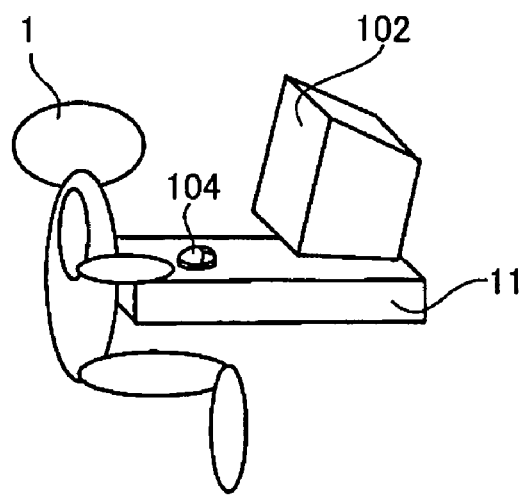
FIG. 3 is a view showing a state that an operator is verifying the operability of the equipment on a virtual space.

FIG. 3 is a view showing a state that an operator is verifying the operability of the equipment on a virtual space. Here, it is assumed that the operability verification apparatus according to the present embodiment is used.

In FIG. 3, there is shown a state that a mouse 104 and a monitor 102 for the image display are put on a desk 11, and an operator 1 verifies the operability of the equipment model that is displayed on the monitor 102.

Figure 4:
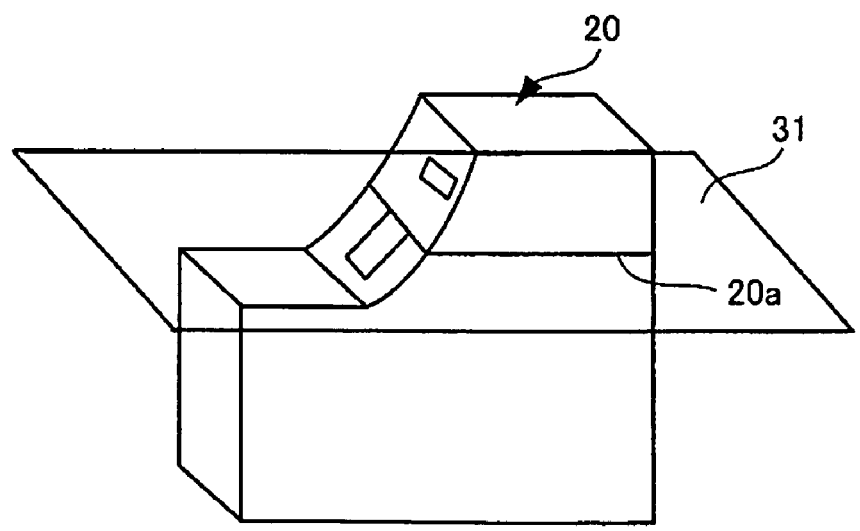
FIG. 4 is a view showing a work plane to cross the equipment (equipment displayed in the monitor) in a virtual space.

FIG. 4 is a view showing a work plane to cross the equipment (equipment displayed in the monitor; ATM by way of example) in a virtual space.

A work plane 31 is defined here in a virtual space where three-dimensional verification model 20 is arranged as shown in FIG. 4 in accordance with the operation of the operator 1. In FIG. 4, the work plane 31 is extended with a section of a part of the three-dimensional verification model 20. In FIG. 4, there is shown an outline 20a in the section by the work plane 31 of three-dimensional verification model 20 for the convenience of the following explanation.

Figure 5:
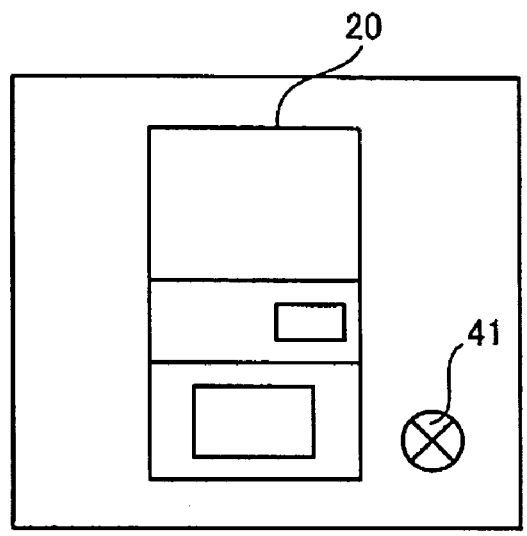
FIG. 5 is a view showing a projection display on a work plane of equipment in a virtual space shown in FIG. 4.

FIG. 5 is a view showing a projection display onto the work plane of the equipment 20 in the virtual space shown in FIG. 4.

Here, after the work plane 31 (Refer to FIG. 4) is defined, the display on the monitor 102 is changed to a two-dimensional projection drawing of the equipment 20 as shown in FIG. 5, and an operability of verification is performed as follows. A mark 41 that indicates the mouse 104 (Refer to FIG. 3) as well as the equipment 20 as the two-dimensional projection drawing is shown on the monitor screen shown in FIG. 5.

Figure 6:
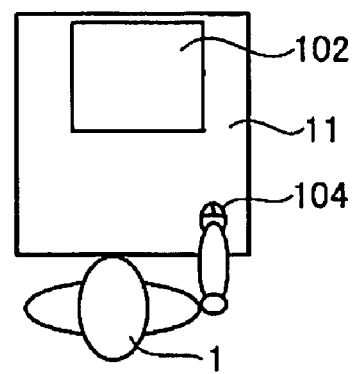
FIG. 6 is a view showing an operators posture when an initial operation position is set.
Figure 7:
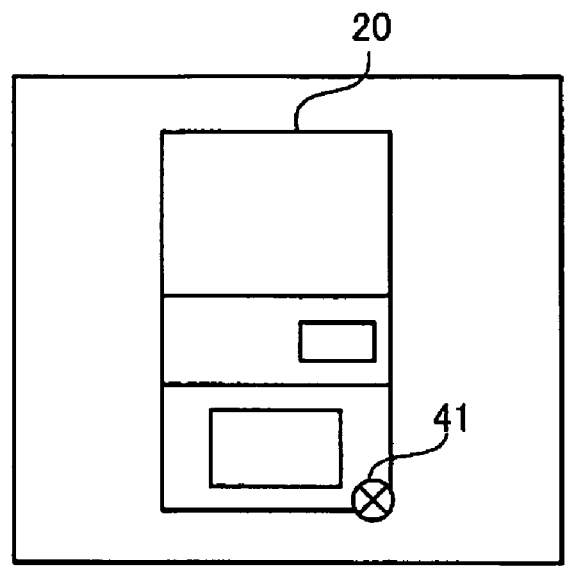
FIG. 7 is a view showing a mark at an initial position on a monitor screen.

FIG. 6 is a view showing an operator's posture when an initial operation position is set. FIG. 7 is a view showing the mark 41 at an initial position on a monitor screen.

An operator 1 has the mouse 104 in the right hand, and clicks the button of the mouse 104 in a posture in which the upper arm of the right arm turns to the right under and the elbow bends in 90 degrees, so that it is informed the operability verification apparatus that the position of the mouse 104 at that time is the initial position.

The operability verification apparatus stores therein an initial location information of the mark 41 in association with coordinates of the equipment 20 in a virtual space. When the mouse 104 is clicked, the mark 41 also moves to an initial position that is shown in FIG. 7.

Figure 8:
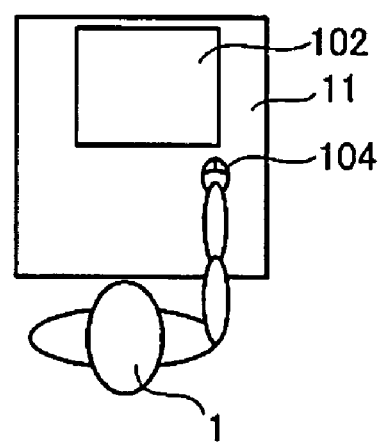
FIG. 8 is a view useful for understanding a state that a mouse is moved.
Figure 9:
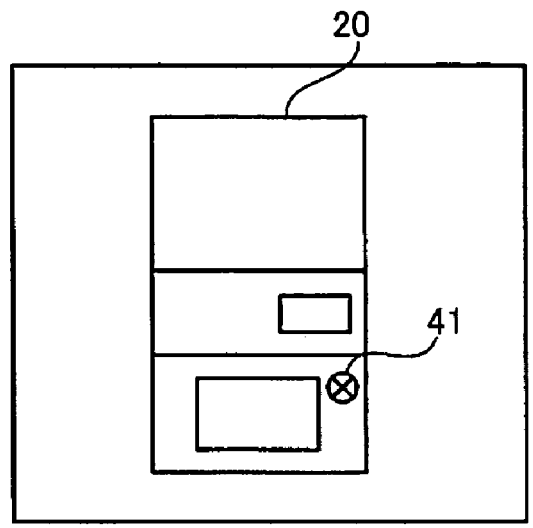
FIG. 9 is a view showing a position of a mark on a monitor screen when a mouse is moved.

FIG. 8 is a view useful for understanding a state that a mouse is moved. FIG. 9 is a view showing a position of a mark on a monitor screen when a mouse is moved.

The operator 1 extends forward the right arm from the initial posture shown in FIG. 6, and moves forward the mouse 104 held by the hand as shown in FIG. 7.

Then, the mark 41 on the monitor screen moves from the position shown in FIG. 8 to the position shown in FIG. 9 in the same direction as the direction where the right arm is extended, too.

The moving direction of the mark 41 on the monitor screen is decided by the relation between the operator 1 and the direction of the equipment 20 displayed on the monitor, and the direction where the arm is extended. The migration length is basically decided in the ratio of the size of the equipment on the real space represented by a three-dimensional verification model and the size of the image of the equipment on the monitor screen.

Additionally, as will be described later, it is possible to determine the migration length of the mark 41 on the monitor screen in consideration of the ratio of physique of actual operator 1 to the physique of the man model (It is called a pseudo user) (for instance, the man of a standard physique, the woman of a standard physique, and a standard of a certain age of child) assumed as users of the equipment.

This feature makes it possible for the operator 1 to evaluate operability while actually feeling the sense when stretching out one's arm toward the equipment by trying to operate the equipment.

Figure 10:
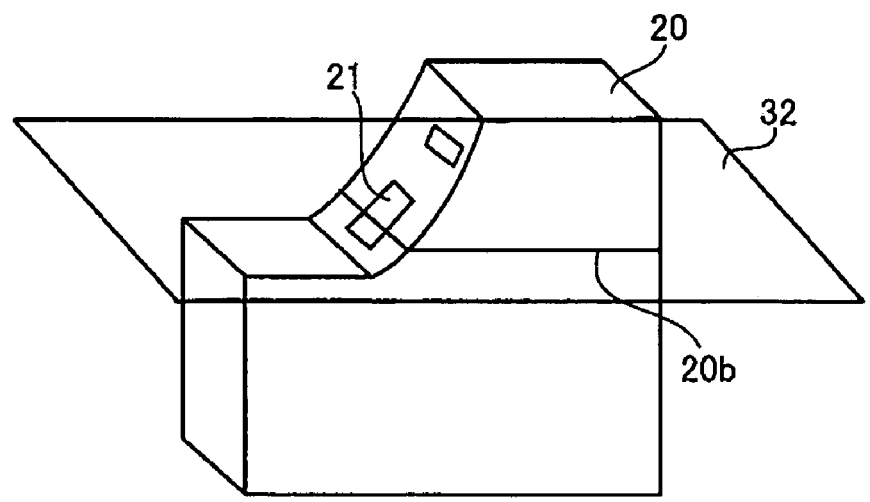
FIG. 10 is a view showing equipment in a virtual space and a work plane to cross the equipment.

FIG. 10 is a view showing equipment in a virtual space and a work plane to cross the equipment, in a similar fashion to FIG. 4.

A work plane 32 shown in FIG. 10 is located a little downward than the work plane 31 shown in FIG. 4 as will be understood from an outline 20b of the section, and crosses a movable part 21 that is one of the component parts of the equipment 20.

Figure 11:
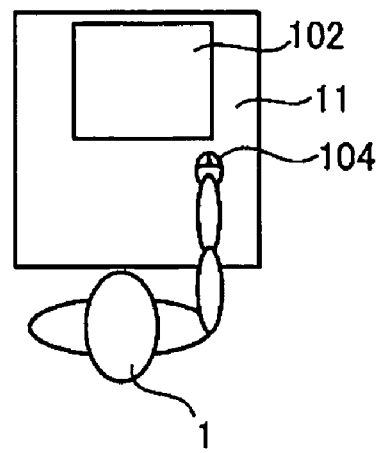
FIG. 11 is a view showing a state that an operator stretches out one's right arm to take movable parts in a monitor screen.
Figure 12:
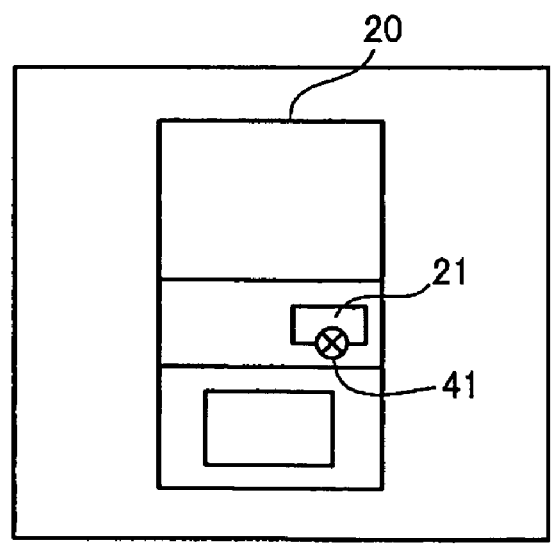
FIG. 12 is a view showing a display image on the monitor screen in the state shown in FIG. 11.

FIG. 11 is a view showing a state that an operator stretches out one's right arm to take movable parts in a monitor screen. FIG. 12 is a view showing a display image on the monitor screen in the state shown in FIG. 11.

Here, as shown in FIG. 12, a projection drawing of the equipment 20 into the work plane 32 shown in FIG. 10 is displayed on the monitor screen.

Here, as shown in FIG. 11, the operator 1 extends the right arm with the mouse 104, and moves the mark 41 on the monitor screen to a position wherein the mark 41 is superposed on the movable part 21 of the equipment 20 illustrated in a two-dimensional projection drawing as shown in FIG. 12. As a result, the operator 1 can actually feel how the arm should be extended to hold the movable part 21.

Here, the button operation of the mouse 104 with the superposition of the mark 41 on the movable part 21 implies that the button operation grips the movable part 21 by the hand.

Figure 13:
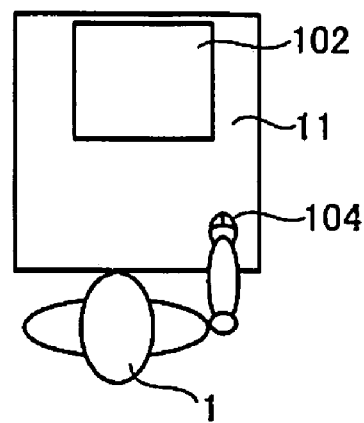
FIG. 13 is a view showing a state that an operator shorten one's right arm to draw the movable part.
Figure 14:
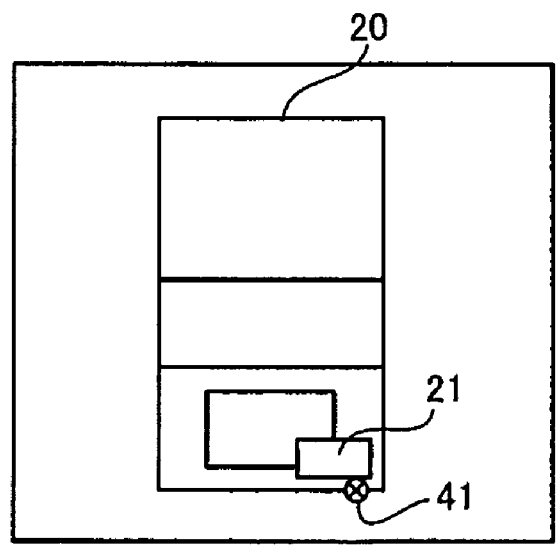
FIG. 14 is a view showing a display image on the monitor screen in the state shown in FIG. 13.

FIG. 13 is a view showing a state that an operator shorten one's right arm to draw the movable part. FIG. 14 is a view showing a display image on the monitor screen in the state shown in FIG. 13.

As shown in FIG. 11, when the button operation of the mouse is carried out with superposing the mark 41 on the movable part 21, and the mouse 104 is moved to the position shown in FIG. 13 while superposing the mark 41 on the movable part 21, the movable part 21 moves together with the mark 41 as shown in FIG. 14. When the movable part 21 reaches the movement limit while the movable part 21 are moved, the movable part on the monitor screen stops at the movement limit, and such an alarm display that the movable part 21 cannot be moved any more appears on the monitor screen. When interference with other parts etc. of the equipment is caused, it is similar even if it doesn't reach the movement limit.

Thus, according to the present embodiment, it is possible to verify the operability through movement of the movable part.

Movement can be stopped about the movable part 21 so as not to move any more when the movable part 21 in a virtual space reaches the movement limit or the movable part 21 interferes with other parts and the like. But when usual mouse 104 is used, the movement of the mouse 104 cannot be stopped. Then, it is acceptable to stop the movable part 21 and inform the operator of the fact that the movable part 21 reaches the movement limit by vibrating and lighting, adopting a pointing device such as mice capable of vibrating and lighting in accordance with the instruction from the main frame of the operability verification apparatus. It is desirable to stop the movable part 21 when the movable part 21 reaches the movement limit in case of the use of a pointing device that cannot be moved upon receipt of the instruction from the main frame of the operability verification apparatus while being able usually to move on a two-dimensional basis, and also to stop the pointing device.

Though it is explained here enumerating the movable part 21 as an example, in the event that the operability is verified when the equipment is assembled or resolved regardless of parts to be fixed after it is assembled as an equipment, it is acceptable to handle the assembling parts or resolution parts in a similar fashion to the above-mentioned movable parts, and to verify the operability (assembly or resolution).

Figure 15:
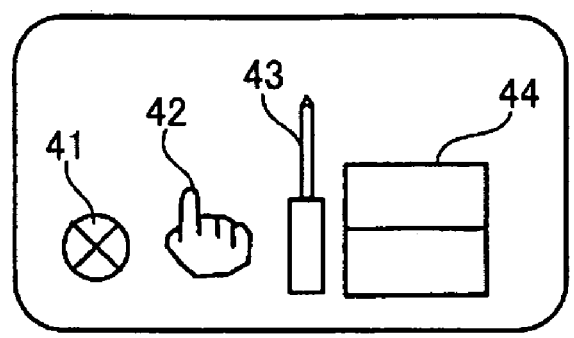
FIG. 15 is a view showing various marks that indicate mouse's position on the monitor screen.

FIG. 15 is a view showing various marks that indicate a position of the mouse 104 on the monitor screen.

According to the example shown in FIG. 15, there are prepared a hand mark 42 that imitates a hand, a driver mark 43 that imitates a driver, and a bankbook mark 44 that imitates a bankbook, as well as a standard mark 41.

The operator 1 chooses an arbitrary mark from among the marks 41-44, so that the mark on the monitor screen can be changed to the chosen mark. The chosen mark is displayed with the size corresponding to the size in display of the device displayed on the monitor screen.

Figure 16:
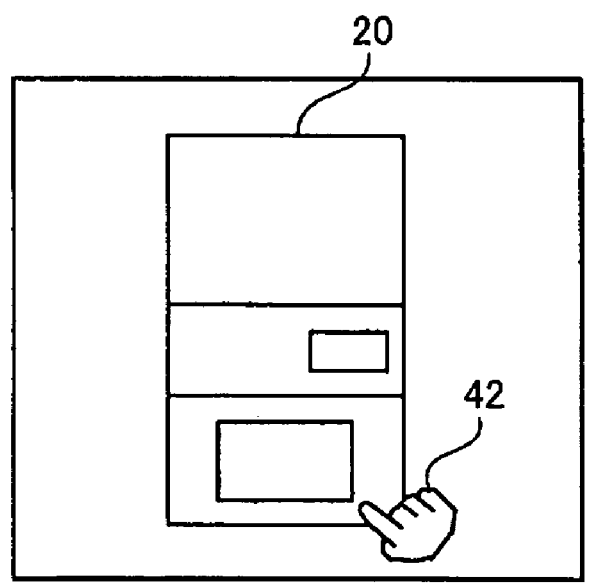
FIG. 16 is a view showing an example in which a hand mark that imitates a hand is displayed.

FIG. 16 is a view showing an example in which a hand mark that imitates a hand is displayed.

Also regarding the operation of the equipment on a real space, it might happen that various operations such that a button is pushed by the finger, it is operated by the driver especially in assembling and resolution, and it is an operation of the insertion of the bankbook into the slot with the bankbook in the hand for the ATM, according to the equipment or according to the scene.

Thus, according to the present embodiment, there is provided such a structure that a variety of kinds of marks are prepared, and an arbitrary mark is displayed on the monitor screen. Accordingly, it is possible to verify it while experiencing the operability of the equipment more really.

Figure 17:
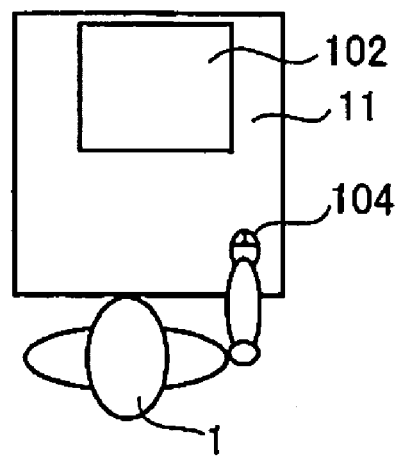
FIG. 17 is a view showing appearance before an operator's right arm is extended.
Figure 18:
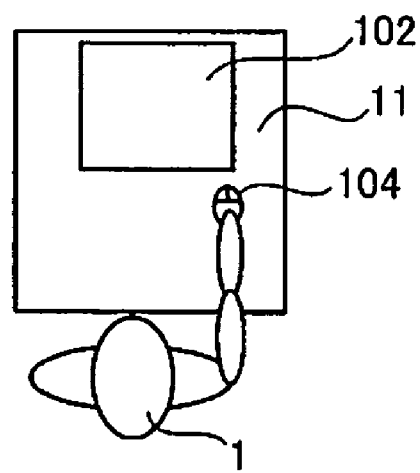
FIG. 18 is a view showing appearance after an operator's right arm is extended.
Figure 19:
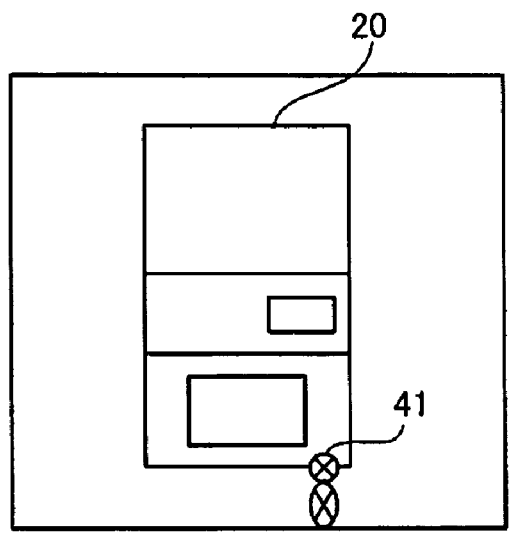
FIG. 19 is a view showing a display image on the monitor screen before an operator stretches out one's arm.
Figure 20:
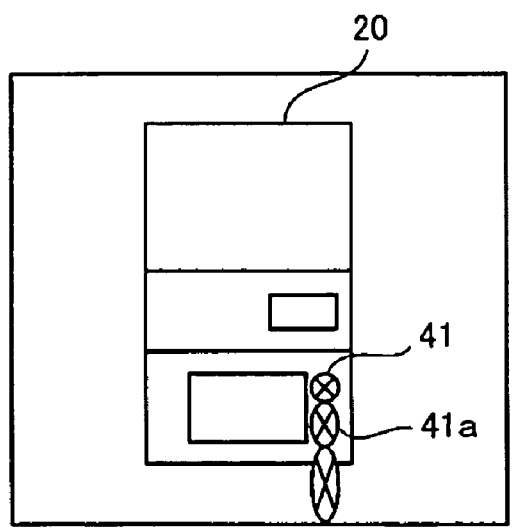
FIG. 20 is a view showing a display image on the monitor screen after an operator stretches out one's arm.

FIG. 17 is a view showing appearance before an operator's right arm is extended. FIG. 18 is a view showing appearance after an operator's right arm is extended. FIG. 19 is a view showing a display image on the monitor screen before an operator stretches out one's arm. FIG. 20 is a view showing a display image on the monitor screen after an operator stretches out one's arm.

Here, when the operator 1 moves the mouse 104, a movement track 41a of the mark 41 is displayed as shown in FIG. 20. Moreover, though it will be explained referring to FIGS. 17-20, it is possible to display the line that is looked and set up in the arm that connects an initial position and the present location of the mark 41 shown in FIG. 20. As for the operability verification apparatus of the present embodiment, these modes are possessed, and when these modes are used, it becomes easy to discover of the obstacle and to confirm space with surroundings while moving.

Figure 21:
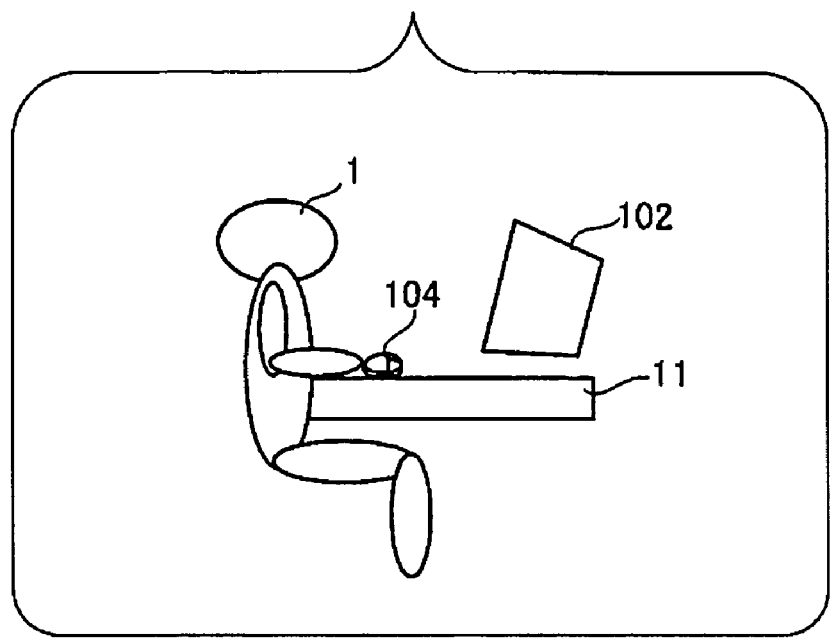
FIG. 21 is a view showing a state where an operator is verifying the operability of the equipment on a virtual space.

FIG. 21 is a view showing a state where an operator is verifying the operability of the equipment on a virtual space. It pays attention to physiques of the operator here.

Figure 22:
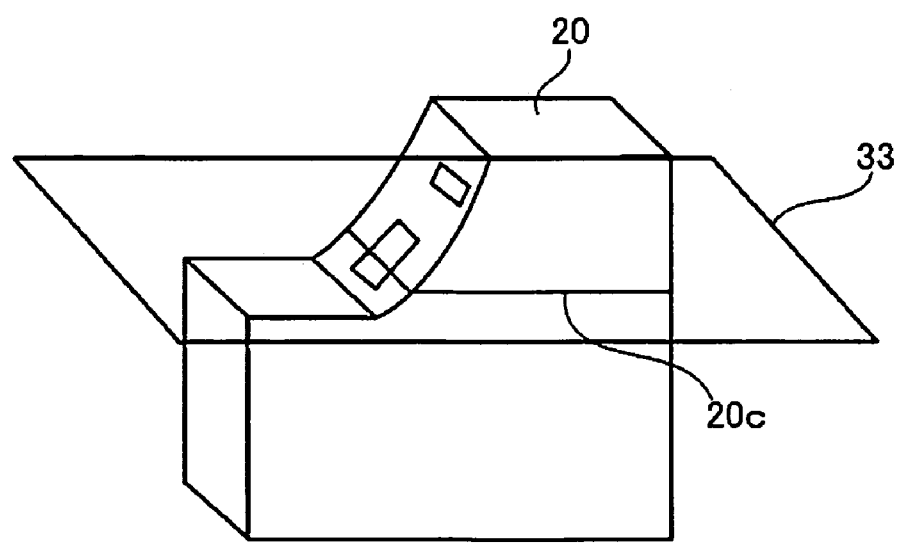
FIG. 22 is a view showing equipment in a virtual space and a work plane to cross the equipment.

FIG. 22 is a view showing equipment in a virtual space and a work plane to cross the equipment. Here, it pays attention to the height of the work plane.

Figure 23:
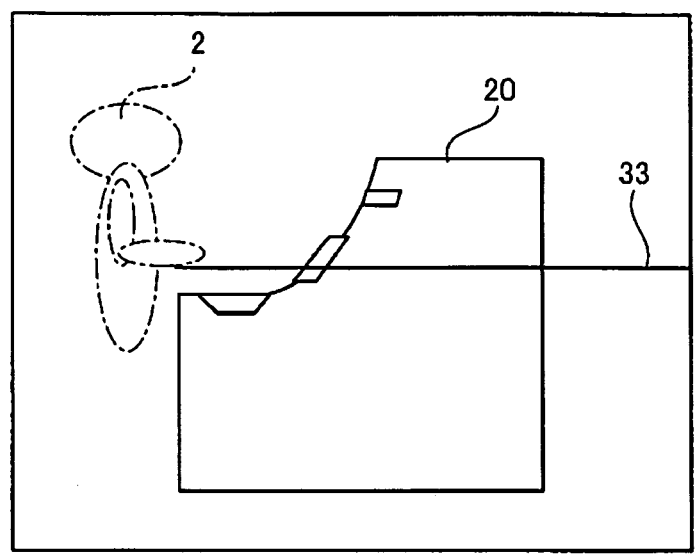
FIG. 23 is a view showing a side elevation of equipment in a virtual space and a user of the equipment in the virtual space.

FIG. 23 is a side elevation of equipment in a virtual space and a view showing a user of the equipment in the virtual space.

The operator 1 displays on the monitor 102 the perspective view of a device 20 shown in FIG. 22, and defines the work plane 33. An outline line 20c is formed here.

Here, it is assumed that the operator 1 is a well-made man, and specifies the woman of a diminutive physique for a user of device 20 in a virtual space. The work plane 33 is assumed to be height matched to the physique of the model of the user 2. Afterwards, the screen on the monitor 102 is changed to the side view of the equipment 20, which is shown in FIG. 23.

Thus, glance matched to the physique of the user 2 and the position of the shoulder are understood from the height of the work plane 33, and the operability of the device 20 for the user 2 can be verified.

Incidentally, though the user 2 is shown in FIG. 23, the purpose of this is to show the position of the user 2 plainly, and the user 2 is not displayed on the screen in the present embodiment. However, it is a preferable aspect that the user 2 is displayed on the screen, too.

Figure 24:
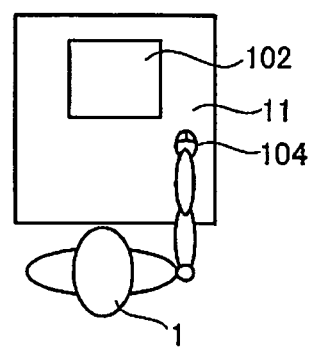
FIG. 24 is a view showing a state where an operator moves a mouse.
Figure 25:
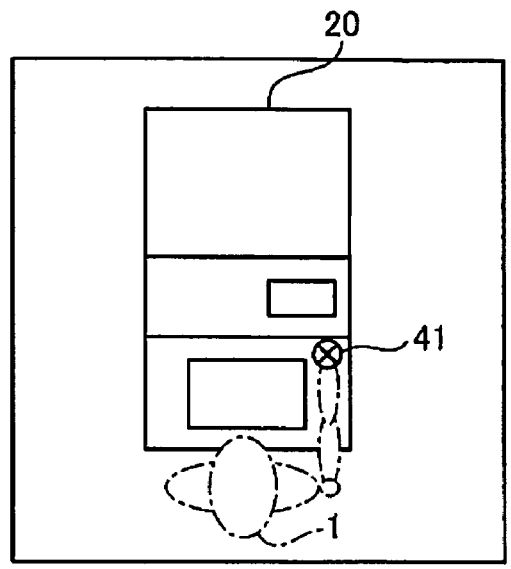
FIG. 25 is a view showing a user's position to equipment when those who operate it become users of equipment in virtual space.
Figure 26:
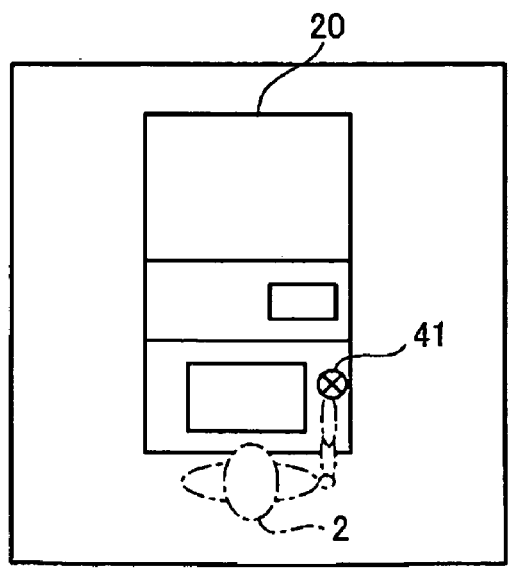
FIG. 26 is a view showing a user's position to equipment when a user that physique is different from those who operate it is specified for a user of equipment in virtual space.

FIG. 24 is a view showing a state where an operator moves the mouse 104. FIG. 25 is a view showing a positional relation of the user (the operator 1) to equipment when the operator 1 becomes the user of the equipment 20 in virtual space. FIG. 26 is a view showing a positional relation of the user 2 to equipment when a user, who is different from the operator in physique, is specified for a user of the equipment 20 in virtual space.

It is assumed here that the operator 1 is a well-made man, and the user 2 in FIG. 26 is woman of a diminutive physique.

In this case, as shown in FIG. 24, when the operator 1 moves the mouse 104 by a prescribed distance, the mark 41 moves to the position corresponding to physique of the operator 1, in case of FIG. 25, and the mark 41 moves only to the position corresponding to the physique of the diminutive woman, in case of FIG. 26.

According to the present embodiment, as stated above, the operator 1 can experience the extending condition of the arm and the load level of the operation by putting the operator 1 in the user of a physique different from physique of the operator 1, by variously changing the physique of a user 2 of the equipment 20 in a virtual space. Thus, according to the present embodiment, it is possible to perform verification of the operability with greater accuracy.

Though FIG. 25 and FIG. 26 show the operator 1 and the user 2, respectively, it is for sake of convenience of the explanation. According to the present embodiment, it is not assumed to display the person model such as the operator and the user on the screen. However, it is a desirable mode that the person model is displayed on the screen.

The explanation of the operability verification using an operability verification apparatus according to the present embodiment is ended, and, next, it explains the operability verification apparatus of the present embodiment.

Figure 27:
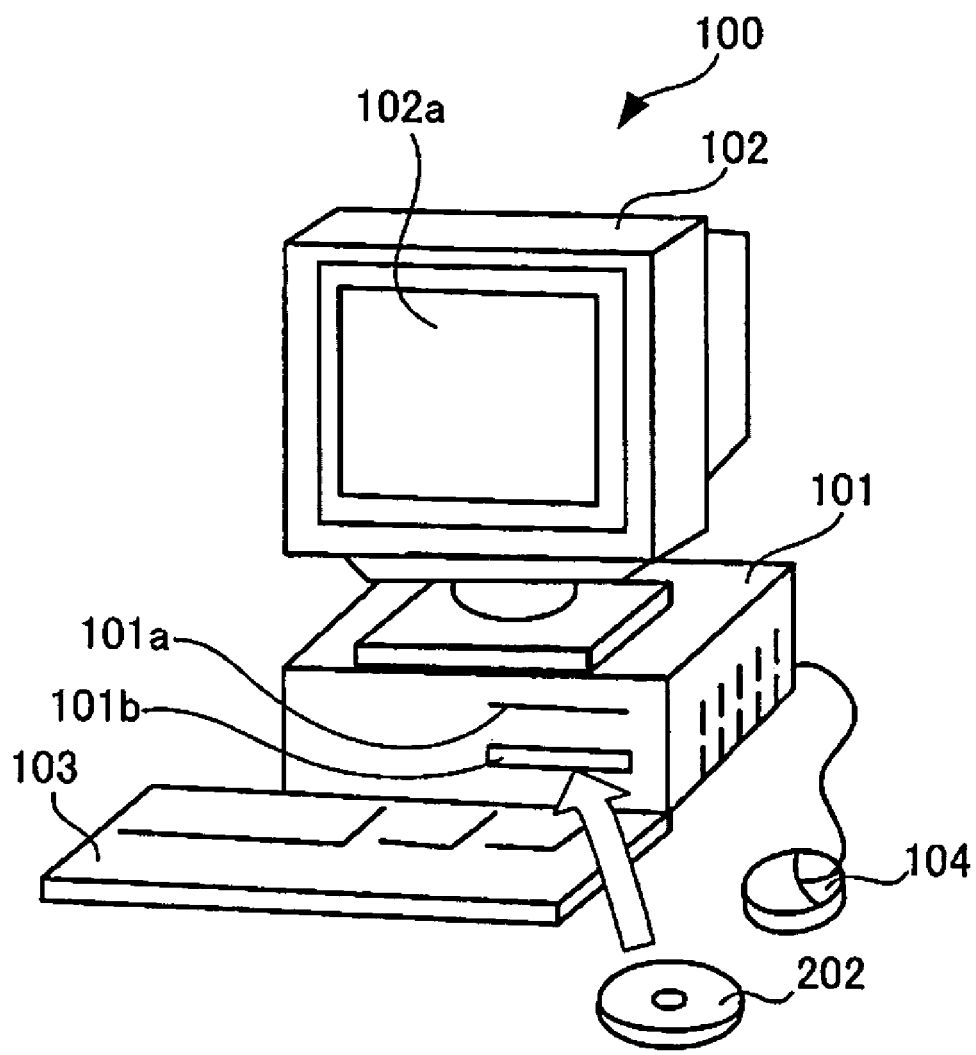
FIG. 27 is a perspective view of a computer that operates as one embodiment of an operability verification apparatus of the present invention in accordance with execution of a program.

FIG. 27 is a perspective view of a computer that operates as one embodiment of an operability verification apparatus of the present invention in accordance with execution of a program. Here, such a computer is referred to as an operability verification apparatus including the program to be executed internally.

An operability verification apparatus 100 shown in FIG. 27 has: a main frame 101 with built-in CPU, a main memory, and a hard disk; a monitor 102 that displays images and character strings on a monitor screen 102a by the instruction from the main frame 101; a keyboard 103 for inputting an operator's instruction to the main frame 101; and a mouse 104 that inputs the instruction associated with icons shown at the position when the specifying it by directing an arbitrary position on the monitor screen 102a. The operability verification apparatus 100 has FD loading entrance 101a to load the flexible disk (Hereafter, it is called FD) and CD/DVD loading entrance 101b to load CD and DVD, on externals.

Figure 28:
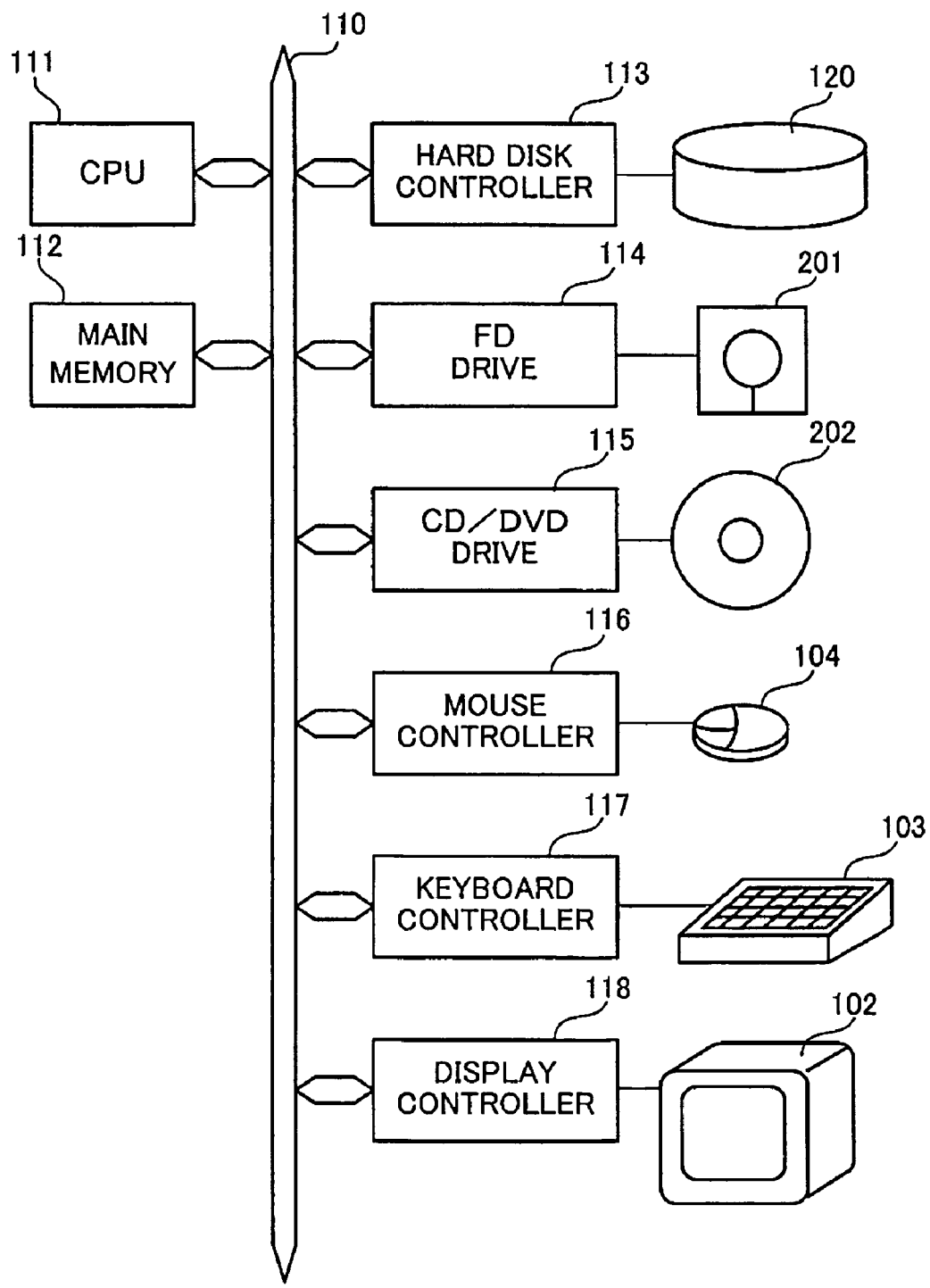
FIG. 28 is a hardware structural view of the operability verification apparatus.

FIG. 28 is a hardware structural view of the operability verification apparatus shown in FIG. 27.

FIG. 28 shows CPU 111 for executing various programs, a main memory 112 in which the program stored in the CPU 111 is read and is developed for execution in the CPU 111, a hard disk controller 113 for controlling a hard disk 120, FD drive 114 that is loaded with FD 201, and accesses the FD 201, CD/DVD drive 115 that is loaded with CD and DVD (Represent it by CD 202 here), and accesses the CD 202, a mouse controller 116 that controls the mouse 104, the keyboard 103, and the monitor 102 shown in FIG. 27, a keyboard controller 117, and a display controller 118. Those elements are connected mutually by a bus 110.

The hard disk 120 stores therein a three-dimensional model that is the design data of equipment that is to be verified in operability, and an operability verification program and various tables to verify the operability of the equipment. The operability verification program is read from the hard disk 120, developed with the main memory 112, and executed with the CPU 111. The three-dimensional model that is stored on the hard disk 120 is read under the execution of the operability verification program is read and it is displayed on the screen of monitor 120. Thus, in the manner as mentioned above, there is verified the operability of the equipment represented by the three-dimensional model.

Figure 29:
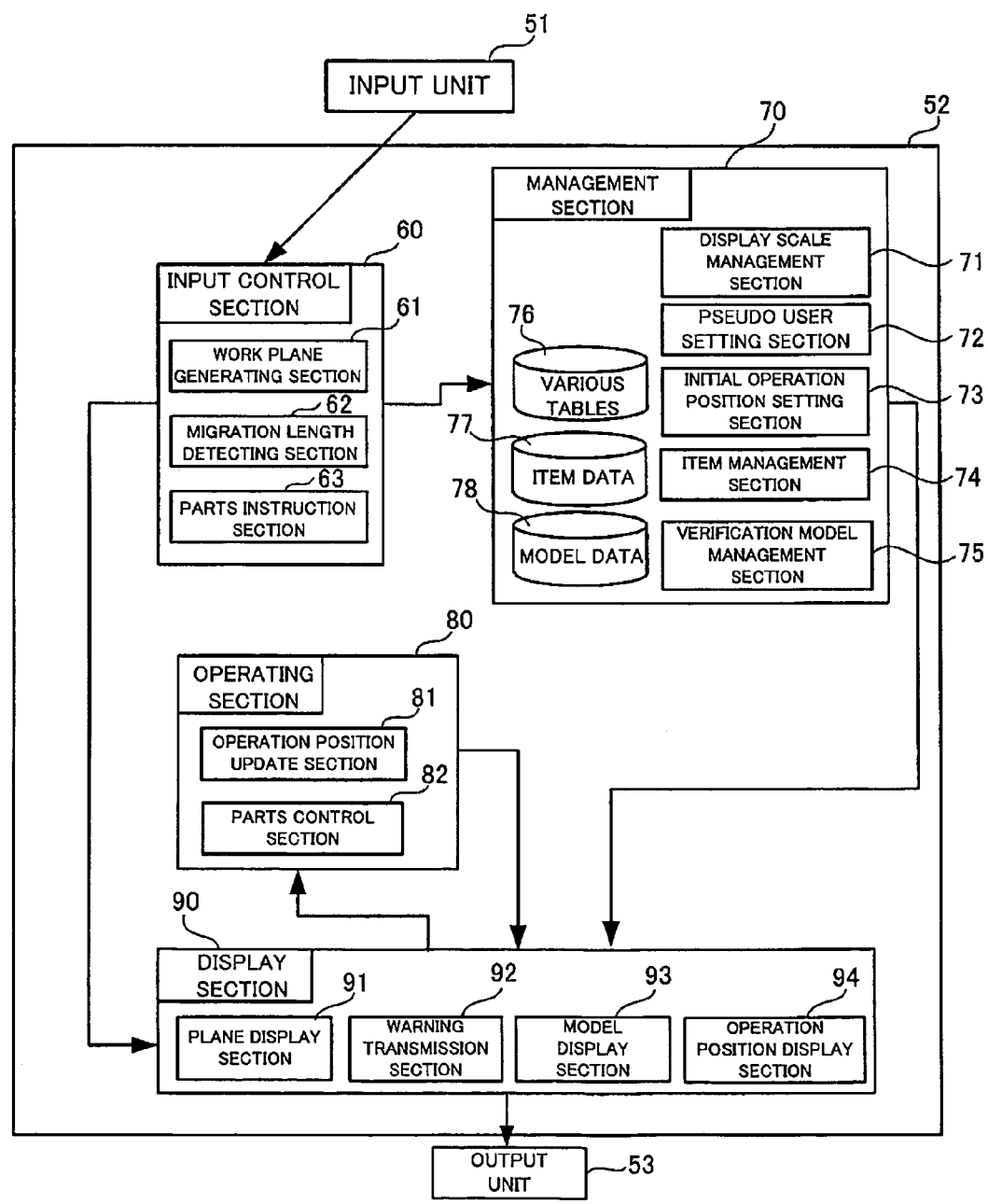
FIG. 29 is a functional block diagram of the operability verification apparatus.

FIG. 29 is a functional block diagram of the operability verification apparatus which is constructed when the operability verification program is executed in the operability verification apparatus 100.

Here, there are shown an input unit 51 that consists of the keyboard 103 and the mouse 104 shown in FIG. 27 and FIG. 28, a main frame device 52 as the function, which is constructed by executing the operability verification program with the CPU 111, and an output unit 53 that consists of the monitor 102 shown in FIG. 27 and FIG. 28.

An input control section 60, a management section 70, an operation section 80, and a display section 90 are constructed in the main frame device 52.

Among these sections, the input control section 60 is provided with a work plane generation section 61, a migration length detection section 62, and a part instruction section 63.

The management section 70 is provided with a display scale management section 71, a pseudo user setting section 72, an initial operation position setting section 73, an item management section 74, and a verification model management section 75. In addition, the management section 70 stores therein various tables 76 which will be described later (refer to FIGS. 30-37), data 77 of various items shown in FIG. 15, and data 78 of three-dimensional model of the equipment.

Moreover, the operation section 80 is provided with an operation position update section 81 and a part control section 82. In addition, the display section 90 is provided with a plane display section 91, a warning transmitting section 92, a model display section 93, and an operation position display section 94.

The work plane generation section 61, the migration length detection section 62, and the part instruction section 63, which constitute the input control section 60, correspond to an element that generate the work plane in a virtual space, an element that acquire information as to migration length and moving direction of the pointing device (the mouse in the present embodiment) that inputs two-dimensional coordinates, and an element that directs parts that move in accordance with mouse operation, respectively.

The display scale management section 71 that composes the management section 70 is an element that manages the display scale (display size) when the three-dimensional model and the work plane are displayed in the output unit 53. The pseudo user setting section 72 is an element that sets a pseudo user assuming that the equipment (three-dimensional model) is operated in a virtual space. That is, the pseudo user setting section 72 sets a correction value to the migration length and the position of the mouse detected with the migration length detection section 62 from the difference of the physiques between the pseudo user and the operator who operates the operability verification apparatus to verifies the operability of the equipment. The initial operation position setting section 73 is an element that associates a position of the mouse on a real space with one point on the work plane in a virtual space when the operability verification begins, and associates the mouse's initial position with an initial position of the mark on the work plane. The item management section 74 is an element that manages two or more kinds of marks indicative of the mouse's position in a virtual space. The verification model management section 75 is an element that manages a three-dimensional model of the equipment in a virtual space that is to be verified in operability.

The operation position update section 81 and the part control section 82, which constitute the operation section 80, are an element that updates the mark position on the work plane in a virtual space in accordance with the real migration length and the direction of the mouse that is detected with the migration length detection section 62, and an element that updates the position of the part directed by the part instruction section 63 in synchronism with the mark position, respectively. The plane display section 91, which constitutes the display section 90, has a function of displaying a cross-sectional view by the work plane, a projective figure on the work plane, of the equipment (three-dimensional model) in a virtual space, and those combinations. When operability of various operation buttons and other operation objects arranged in externals of the equipment is verified, it is desirable to display the projective figure because information on an internal structure of the equipment is unnecessary. It is desirable to display a cross-sectional view when information on an internal structure of the equipment is necessary for the build and taking apart of the equipment (three-dimensional model).

The warning transmitting section 92, which constitutes the display section 90, is an element that displays on the monitor screen, when there is generated a state that a part that is directed in the part instruction section 63 and is controlled in the movement with the part control section 82 reaches the movement limit value, or interference with other parts occurs, so that the part cannot move any more, such a warning that the part is impossible to move any more.

The model display part 93, which constitutes the display section 90, is an element that receives three-dimensional model managed in the verification model management section 75, receives positional updated information of parts from the part movement section 82 in addition, and displays it in the output unit 53. The operation position display section 94 is an element that updates the display position of the mark that is updated in the operation position update section 81.

Next, it explains various tables 76 managed in the management section 70.

FIG. 30 is a view showing a pseudo user table.

"USER" indicates an operator of the operability verification apparatus, and heights "height" (the unit is mm) of the operator is input as a variable.

Here in each "ID", there are defined "Pseudo user name", "Height", "Arm", "Arm angle", "Forearm", "Forearm angle", "Horizontal distance X from the shoulder", and "Horizontal distance Y from the shoulder".

Here, "USER", "MAN50%", and "FEMALE50%" are defined as "ID". "USER" indicates an operator of the operability verification apparatus. The operator inputs height "height" of the operator as a variable. The lengths of "Arm" and "Forearm" are calculated by "0.1676×height" and "0.1490×height" in accordance with the input height "height", respectively.

A pseudo user who has ID of "MAN50%" is a pseudo user of the physique of the tile value of the adult male 50% (man at the center when a lot of adult males are arranged in order of the physique), and a pseudo user who has ID of "FEMALE50%" is a pseudo user of the physique of the tile value of the adult female 50%.

"Arm angle" is described in this table as "0". This means that the upper arm vertically falls. Moreover, "Forearm angle" is described in this table as "90". This means that the forearm bends from the upper arm by 90 degrees and the forearm expands.

"Horizontal distance X from the shoulder" and "Horizontal distance Y from the shoulder" indicate the position of the point (hand) of the forearm when the shoulder is made a starting point.

"Arm angle"="0" and "Forearm angle"="90" indicate the initial state of the arm. "Horizontal distance X from the shoulder" in the initial state is the same as length of "Forearm" and "Horizontal distance Y from the shoulder" is "0". However, "Arm angle", "Forearm angle", "Horizontal distance X from the shoulder", and "Horizontal distance Y from the shoulder" are updated to the value at that time when moving one's arm by operating the mouse.

FIG. 31 is a view showing an item table.

The item table of FIG. 31 is a table that defines the kind of the mark on the monitor image of the mouse shown in FIG. 15.

Here, in each "ID", there are defined "Item name", "Pointer coordinates (X)", "Pointer coordinates (Y)", "Rotation angle", "Image filter", "Width of the image", and "Width of length of the image". "Pointer coordinates (X)" and "Pointer coordinates (Y)" mean the offset values from the starting points of the images that show their associated items, respectively. When the image of the item is displayed on the monitor screen, the image of the item is displayed in such a manner that the points of the "Pointer coordinates (X)" and "Pointer coordinates (Y)" are coincident with the position of the point of the upper arm.

"Rotation angle" means that the image of the item is displayed in the direction rotating only the rotation angle with which is generated there when the image of the item is displayed.

"Image file name" indicates a file name of the file where the image data of the item is stored. "Width of the image" and "Width of length of the image" indicate the size of the image. However, when an actual display is carried out, it is displayed on the scale changed in accordance with the display scale of the image of the model of the device displayed on the monitor screen.

FIG. 32 is a view showing a warning message table.

Here in each "ID", there are defined "Alert message" and "Detailed explanation". When parts are moved (rotation), so that the phenomenon described in the column of "Alert message" is generated, the character described in the column of "Detailed explanation" corresponding to them is displayed on the monitor screen.

FIG. 33 is a view showing a work plane table.

Here in each "ID", there are defined "Absolute coordinate (X)", "Absolute coordinate (Y)", "Absolute coordinate (Z)", "Rotation angle", "Display scale", "Projective method", and "Verification model".

"Absolute coordinate (X)" means the Y-Z plane that extends to the position of the coordinates (X). "Absolute coordinates (Y)" means the X-Z plane that extends to the position of the coordinates (Y). "Absolute coordinates (Z)" means the X-Y plane that extends to the position of the coordinates (Z).

"Rotation angle" means toward which direction a pseudo user looks for the work plane. As for "Rotation angle"="0", it means that a pseudo user is turning in front of the equipment projected on the work plane (or, section). "Rotation angle"="45" means that a pseudo user is in the posture that turns from the front of the equipment projected on the work plane (or, section) diagonally only by 45 degrees.

"Display scale" means the display scale on the monitor screen to a real size of the equipment. It is not displayed on the monitor screen like a real size of the equipment even in case of "Display scale"="1" however, and it is displayed with the size of a certain fixed standard ratio. The display size on the monitor screen depends on the size of the monitor screen.

"Projective method" defines, as to the equipment as three-dimensional model, whether the projection drawing onto the work plane is displayed, the cross section is displayed, or those combination is displayed.

In addition, "Verification model" indicates that the work plane is defined about which equipment (which three-dimensional model) when two or more equipment (three-dimensional model) to be verified in operability exist. Here, the equipment to be verified in operability is an ATM represented by a certain one three-dimensional model, and any ID is described here as "ATM".

FIG. 34 is a view showing an initial operation position table.

"Work plane", "Plane coordinates (X)", and "Plane coordinates (Y)" are defined here in each "ID".

"Work plane" is "ID" of the work plane defined by the work plane table shown in FIG. 33. "Plane coordinates (X)" and "Plane coordinates (Y)" indicate an initial position of the mark corresponding to the mouse on the work plane when the work plane is selected. When operator operates the mouse in the button in the initial state of the arm (state in which the upper arm is arranged vertically, and the forearm is bent 90 degrees from the upper arm), the mark of the mouse is displayed at an initial position on the work plane.

Not only the X-Y plane but also the Y-Z plane and the X-Z plane are defined in the work plane table shown in FIG. 33 as a work plane. This is a definition of the work plane because of three-dimensional model of the device. Especially, an actual operation at the time of the build and taking apart for the equipment is performed by making the equipment turn sideways or making the work plane become to a horizontal plane. To the contrary, "Plane coordinates (X)" and "Plane coordinates (Y)" in the initial operation position table of FIG. 34 indicate an initial position of the mark on the work plane after the equipment is made to turn sideways for instance so that the work plane may become the horizontal.

FIG. 35 is a view showing a part instruction control table.

"Part name", "Part type", "Shape-ID", "Starting point", and "Movement limitation" are defined here in each "ID".

The distinction of "ASSY" (assembly parts) or "PARTS" (single parts) is described in "Part type". Shape ID indicative of the shape of the part is described in "Shape-ID".

"Starting point" indicates an initial position on the three-dimensional model of the representative coordinates of the part, and "X", "Y", and "Z" of "Movement limitation" indicate the movement limitation coordinates of the representative coordinates of the part. For instance, initial positions of parts of "ID"="PART003" are (X,Y,Z)=(−0.02, 3.9, 183.1), and are permitted moving to the position of (X,Y,Z)=(5.7, 15.5, 57).

"RX", "RY", and "RZ" of "Movement limitation" indicate the limitation of the rotation of the circumference of X axis, Y axis, and Z axis, respectively. For instance, the rotation up to 110 degrees of the circumference of Y axis in the rotation angle is permitted as for parts of "ID"="PART002".

FIG. 36 is a view showing a migration length table.

"ID", "Plane coordinates (X)" and "Plane coordinates (Y)" are defined here.

The migration length table indicates the amount of the movement of the mouse. Though the mouse receives the detection of the amount of the movement at prescribed intervals of time, "Plane coordinates (X)" and "Plane coordinates (Y)" of the migration length table indicate the amount of the movement in the direction of X and the direction of Y respectively about the mouse between from the detection timing immediately before to the present detection timing.

FIG. 37 is a view showing an operation position update table.

"Initial position", "Pseudo user", "Update position coordinates (X)", "Update position coordinates (Y)", "Item", "Parts", "Warning", and "Active" are defined here in each "ID".

ID in the initial positional table of FIG. 34 is described in "Initial position", and, as a result, the work plane and an initial position of the mark on the work plane is defined.

ID in the pseudo user table of FIG. 30 is described in "Pseudo user".

"Update position coordinates (X)" and "Update position coordinates (Y)" indicate the present location of the mark on the work plane. The present location is decided by "plane coordinates (X)" and "Plane coordinates (Y)" that indicate an initial position of the mark, of FIG. 34", moving informational of the mouse with the migration length table of FIG. 36, "Display scale" in the work plane table of FIG. 33, and the difference in the physique (length of the upper arm and the forearm) between "USER" in the pseudo user table of FIG. 30 and "Pseudo user" that is now used.

ID in the item table of FIG. 31 is described in "Item". The mark of the item of ID described in the column of the "Item" is displayed at the top position of the forearm on the work plane corresponding to the position of the mouse on a real space. ID in the part instruction control table of FIG. 35, that is, parts that are moved in synchronism with the movement of the mark on work plane, are described in "Parts".

ID in the alert message table shown in FIG. 32 is described in "Warn". The purpose of this is to display warning according to the ID on the monitor screen when arriving at the situation in which parts etc. cannot be moved.

"Active" is the one that indicates ID effective (active) now among two or more (here three) ID in the operation position update table. In FIG. 37, "ID"="MOVE001" is effective.

FIG. 38 is a flowchart useful for understanding a program to be executed in the operability verification apparatus shown in FIG. 27 and FIG. 28.

Here, there will be explained the flowchart of FIG. 38 referring to a block chart of FIG. 29 and various tables of FIGS. 30-37.

Here, first of all, upon receipt of the operation from an operator of the operability verification apparatus, model data for the verification is read, and the equipment indicated by the model data is displayed on the monitor screen (step S01).

Next, the work plane is generated (step S02). This work plane is generated by specifying which ID of ID in the operation position update table shown in FIG. 37 is to be activated by an operator. For instance, according to the example shown in FIG. 37, "ID"="MOVE001" is active. "Initial position"="STRAT001" is specified by "ID"="MOVE001". "Work plane"="ITEM001" is specified by "ID"="STRAT001" of the initial operation position table of FIG. 34. The X-Y plane with the value of Z=40 as a work plane is generated from "Absolute coordinate (Z)"="40" that is specified by "ID"="ITEM001" of the work plane table of FIG. 33. The projection drawing of the equipment on the work plane is generated with the display scale of display scale=1, and the projection drawing is displayed, because "Display scale"="1" and "Projective method"="Projection" are specified by "ID"="ITEM001" of the work plane table of FIG. 33.

It explains here assuming that the work plane table etc. have already been defined, and it is also possible to specify a new work plane by the operator's operation.

Next, the initial operation position is set (step S03).

In the step of the setting of the initial operation position, the mark that corresponds to the mouse on the output unit 53 moves to a prescribed initial position by the model display section 93 when an operator holds the mouse in the hand, puts it on the desk, extends the upper arm vertically, bends the forearm from the upper arm by 90 degrees, and extends the forearm forward, and the operator operates the mouse's button in the state of the posture as mentioned above. According to the example as mentioned above, "ITEM001" is specified for a work plane, and "Plane coordinates (X)"="40" and "Plane coordinates (Y)"="50" are specified in the initial operation position table of FIG. 34 in association with "Work plane"="ITEM001". Therefore, the coordinates point of (X,Y)=(40,50) on the work plane becomes an initial position of the mark.

Next, it is judged whether a pseudo user operates the equipment in a virtual space (step S04). When it is decided that the pseudo user operates it, the pseudo user's setting is performed (step S05). Decision as to whether the pseudo user performs in step S04 is carried out by referring to the column of "Pseudo user" of the operation position update table of FIG. 37. An operator becomes a user of the equipment in a virtual space when described in the column as "USER", and a pseudo user, who is different from the operator in physique, becomes the user of the equipment in a virtual space, when described in the column as other than "USER".

In step S05, the pseudo user table shown in FIG. 30 is referred to, and the correction value is determined from the difference in the physique between the operator and the pseudo user employed this time. As for the correction value, it is adopted when the migration length of the mark in a virtual space is determined from the moved distance of the mouse by the operator. For instance, when pseudo user's physique is more diminutive than operator's physique, the amount of the movement of the mark is changed. As a first amount of the movement, the amount of the movement to be shortened only in the ratio of physiques is calculated. As a second amount of the movement, the angle of the joint of the operator is computed by the reverse-kinematics assuming that the hand, the forearm, and the upper arm are the link from physique information, and the angle of the joint is put to a pseudo user, so that the position of the hand from the length of the forearm and the length of the upper arm is computed, as the amount of the movement.

Moreover, in step S06 in FIG. 38, it is judged whether parts to be moved in synchronism with the movement of the mouse exist. When the parts to be moved together exist, it is set that the part moves in accordance with mouse's movement (step S07). It is judged first whether parts moved together exist by referring to the column of "Parts" in the operation position update table of FIG. 37. Afterwards, it is also possible to change whether to move the part or another part by the operator's instruction. When it is changed, the column of "Parts" of the operation position update table of FIG. 37 is rewritten.

In step S08, it is judged whether the item of the mark on the screen corresponding to the mouse is to be changed. When it is decide that the item is to be changed, a new item is set (step S09), and the new item is displayed.

As for this item, first, it is preset according to the reference to the column of "Item" of the operation position update table of FIG. 37. Thereafter, it is possible to change by the operator's operation. When it is changed, the column of "Item" of the operation position update table of FIG. 37 is changed too.

After the above-mentioned setting, the operability is verified by the mouse operation by the operator.

First of all, in step S11, the amount of the movement of the mark on the work plane is computed from the amount of the movement of the mouse. As for the amount of the movement, of the mouse, it can know amount of the movement and direction of the movement, of the mouse by always monitoring it because it is recorded in the migration length table of FIG. 36 at each of movement amount detection timings. The amount of the movement and the direction of the movement, of the mark on the work plane, are computed based on the amount of the movement and the direction of the movement, of the mouse, the display scale (Refer to the work plane table for FIG. 33), and the correction value determined from the difference in the physique between the operator (USER) and the pseudo user, where the pseudo user is set.

Next; it is judged whether part, which is moved in synchronism with the movement of a mark, is set, and the mark overlaps with the part on the monitor screen. When it is decided that the part is not set, or when the part does not overlap with the mark (That is, when the mark does not touch with the part yet) even if the part is set, the process goes to step S13 in which the position of the mark is updated based on the amount of the movement of the mark which is computed in step S11.

On the other hand, when it is decided in step S12 that the part is set and the mark overlaps with the part, the process goes to in step S14 in which it is judged whether the part reaches the movement limitation value. The part is moved when it is decided that the part doesn't reach the movement limitation value (step S15). It is judged whether interference with other parts etc. is generated (step S16). The position of the mark is updated when it is decided that the interference is not generated (step S13).

When it is decided in step S14 that the part reaches the movement limitation value, or when it is decided in step S16 that the interference is generated, the process goes to step S17 in which warning is sent (Refer to FIG. 32).

When the verification of operability continues after the mark position is updated in step S13 (step S18), it returns to the calculation of the amount of the movement of the mark in step S11. When setting is changed (step S19), it returns to step S04.

According to the present embodiment, in the manner as mentioned above, the operability of the equipment is verified on the simulation.

What is claimed is:

1. An operability verification apparatus having a main frame body section that performs operation, a display screen that displays an image, and a pointing device that is moved by user's hand and notifies the main frame body section of direction of movement and migration length, wherein the image of a three-dimensional model on data that represents an equipment as an object to be verified is displayed on the display screen, and an operability of the equipment is verified by a simulation, the operability verification apparatus comprising:
   a work plane generation section that generates a work plane formed of a horizontal plane which intersects the equipment as the object when the equipment is disposed in a real space, on a virtual space where the three-dimensional model is disposed;
   a plane display section where a two-dimensional image on the work plane generated in the work plane generation section of the three-dimensional model is displayed on the display screen;
   a display scale management section that manages a ratio of a display size of the equipment on the display screen to a real size of the equipment; and
   a mark display update section in which a mark representative of the pointing device is displayed on the display screen, and upon receipt of the notification of direction of movement and migration length of the pointing device, the mark on the display screen is moved in the direction of the movement corresponding to the direction of the movement of the pointing device by only a migration length in which the ratio is considered, the ratio being managed in the display scale management section, and
   a pseudo user table that describes body sizes of an operator who operates the pointing device and body sizes of a pseudo user assuming a user who uses the equipment, wherein
   the mark display update section moves the mark on the display screen by only a migration length in consideration of a difference in body sizes between the operator and the pseudo user as well as the ratio.

2. The operability verification apparatus according to claim 1, further comprising an initial position setting section wherein an initial operation position of the pointing device is associated with an initial display position of the mark on the display screen.

3. The operability verification apparatus according to claim 1, further comprising an item table that describes two or more kinds of marks on the display screen, the marks each being representative of the pointing device, and
   wherein the mark display update section receives a specification of the kind of the mark by the operator, and displays a specified kind of mark on the display screen.

4. The operability verification apparatus according to claim 1, wherein the mark display update section displays on the display screen movement tracks of the mark or a line where a predetermined initial position and a present location of the mark are connected with one another.

5. The operability verification apparatus according to claim 1, further comprising:
   a part specification section that specifies parts that compose the three-dimensional model; and
   a part control section that moves parts specified by the part specification section in synchronism with the movement of the mark.

6. The operability verification apparatus according to claim 5, further comprising a warning sending section that generates a warning upon receipt of generation of a state where movement of the parts is disturbed.

7. A non-transitory computer-readable storage medium storing an operability verification program which is executed in an information processing apparatus having a main frame body section, a display screen that displays an image, and a pointing device that is moved by user's hand and notifies the main frame body section of direction of movement and migration length, so that the operability verification program causes the information processing apparatus to operate as an operability verification apparatus wherein the image of a three-dimensional model on data that represents an equipment as an object to be verified is displayed on the display screen, and an operability of the equipment is verified by a simulation, the operability verification program causing the information processing apparatus to operate as the operability verification apparatus comprising:
   a work plane generation section that generates a work plane formed of a horizontal plane which intersects the equipment as the object when the equipment is disposed in a real space, on a virtual space where the three-dimensional model is disposed;
   a plane display section where a two-dimensional image on the work plane generated in the work plane generation section of the three-dimensional model is displayed on the display screen;
   a display scale management section that manages a ratio of a display size of the equipment on the display screen to a real size of the equipment; and
   a mark display update section in which a mark representative of the pointing device is displayed on the display screen, and upon receipt of the notification of direction of movement and migration length of the pointing device, the mark on the display screen is moved in the direction of the movement corresponding to the direction of the movement of the pointing device by only a migration length in which the ratio is considered, the ratio being managed in the display scale management section, and
   a pseudo user table that describes body sizes of an operator who operates the pointing device and body sizes of a pseudo user assuming a user who uses the equipment, wherein
   the mark display update section moves the mark on the display screen by only a migration length in consideration of a difference in body size between the operator and the pseudo user as well as the ratio.

8. The non-transitory computer-readable storage medium according to claim 7, wherein the operability verification program causes the information processing apparatus to operate as the operability verification apparatus further comprising an initial position setting section wherein an initial operation position of the pointing device is associated with an initial display position of the mark on the display screen.

9. The non-transitory computer-readable storage medium according to claim 7, wherein the operability verification program causes the information processing apparatus to operate as the operability verification apparatus further comprising an item table that describes two or more kinds of marks on the display screen, the marks each being representative of the pointing device, and wherein the mark display update section receives a specification of the kind of the mark by the operator, and displays a specified kind of mark on the display screen.

10. The non-transitory computer-readable storage medium according to claim 7, wherein the operability verification program causes the information processing apparatus to operate as the operability verification apparatus wherein the mark display update section displays on the display screen movement tracks of the mark.

11. The non-transitory computer-readable storage medium according to claim 7, wherein the operability verification program causes the information processing apparatus to operate as the operability verification apparatus further comprising:

a part specification section that specifies parts that compose the three-dimensional model; and a part control section that moves parts specified by the part specification section in synchronism with the movement of the mark.

12. The non-transitory computer-readable storage medium according to claim 7, wherein the operability verification program causes the information processing apparatus to operate as the operability verification apparatus further comprising a warning sending section that generates a warning upon receipt of generation of a state where movement of the parts is disturbed.

13. An operability verification method in which there is used an operability verification apparatus having a main frame body section that performs operation, a display screen that displays an image, and a pointing device that is moved by user's hand and notifies the main frame body section of direction of movement and migration length, wherein the image of a three-dimensional model on data that represents an equipment as an object to be verified is displayed on the display screen, and an operability of the equipment is verified by a simulation, the operability verification method comprising:

work-plane-generating including generating a work plane formed of a horizontal plane which intersects the equipment as the object when the equipment is disposed in a real space, on a virtual space where the three-dimensional model is disposed;

plane-displaying including displaying a two-dimensional image on the work plane generated in the work-plane-generating of the three-dimensional model on the display screen;

display-scale-managing including managing a ratio of a display size of the equipment on the display screen to a real size of the equipment; and mark-display-updating including displaying a mark representative of the pointing device on the display screen, and through moving the pointing device and notifying the main frame body section of a direction of movement and a migration length of the pointing device, moving the mark on the display screen in the direction of the movement corresponding to the direction of the movement of the pointing device by only a migration length in which the ratio is considered, the ratio being managed in the display-scale-managing, wherein the operability verification apparatus stores a pseudo user table that describes body sizes of an operator who operates the pointing device and body sizes of a pseudo user assuming a user who uses the equipment, and the mark-display-updating includes moving the mark on the display screen by only a migration length in consideration of a difference in body sizes between the operator and the pseudo user as well as the ratio.

14. The operability verification method according to claim 13, further comprising initial-position-setting including associating an initial operation position of the pointing device with an initial display position of the mark on the display screen.

15. The operability verification method according to claim 13, wherein the operability verification apparatus stores an item table that describes two or more kinds of marks on the display screen, the marks each being representative of the pointing device, and wherein the mark-display-updating specifies the kind of the mark, and displays a specified kind of mark on the display screen.

16. The operability verification method according to claim 13, wherein the mark-display-updating displays on the display screen movement tracks of the mark.

17. The operability verification method according to claim 13, further comprising:

part-specifying including specifying parts that compose the three-dimensional model; and part-controlling including moving parts specified by the part-specifying in synchronism with the movement of the mark.

\* \* \* \* \*